INVENTORS P. G. EDWARDS
D. D. ROBERTSON
J. O. SMETHURST

BY N. S. Ewing
ATTORNEY

CROSS-CONTROL COMPANDOR USED AS ECHO SUPPRESSORS

Filed Feb. 24, 1954 3 Sheets-Sheet 2

INVENTORS P. G. EDWARDS
D. D. ROBERTSON
J. O. SMETHURST
BY N. S. Ewing
ATTORNEY

CROSS-CONTROL COMPANDOR USED AS ECHO SUPPRESSORS

Filed Feb. 24, 1954 3 Sheets-Sheet 3

INVENTORS P. G. EDWARDS
D. D. ROBERTSON
J. O. SMETHURST

BY N. S. Ewing
ATTORNEY

United States Patent Office 2,825,764

Patented Mar. 4, 1958

2,825,764

CROSS-CONTROL COMPANDOR USED AS ECHO SUPPRESSORS

Paul G. Edwards, Verona, Donald D. Robertson, Morristown, and Joseph O. Smethurst, Bloomfield, N. J., assignors to Bell Telephone Laboratories, Incorporated, New York, N. Y., a corporation of New York Application February 24, 1954, Serial No. 412,224

2 Claims. (Cl. 179—170.2)

Figure 1:
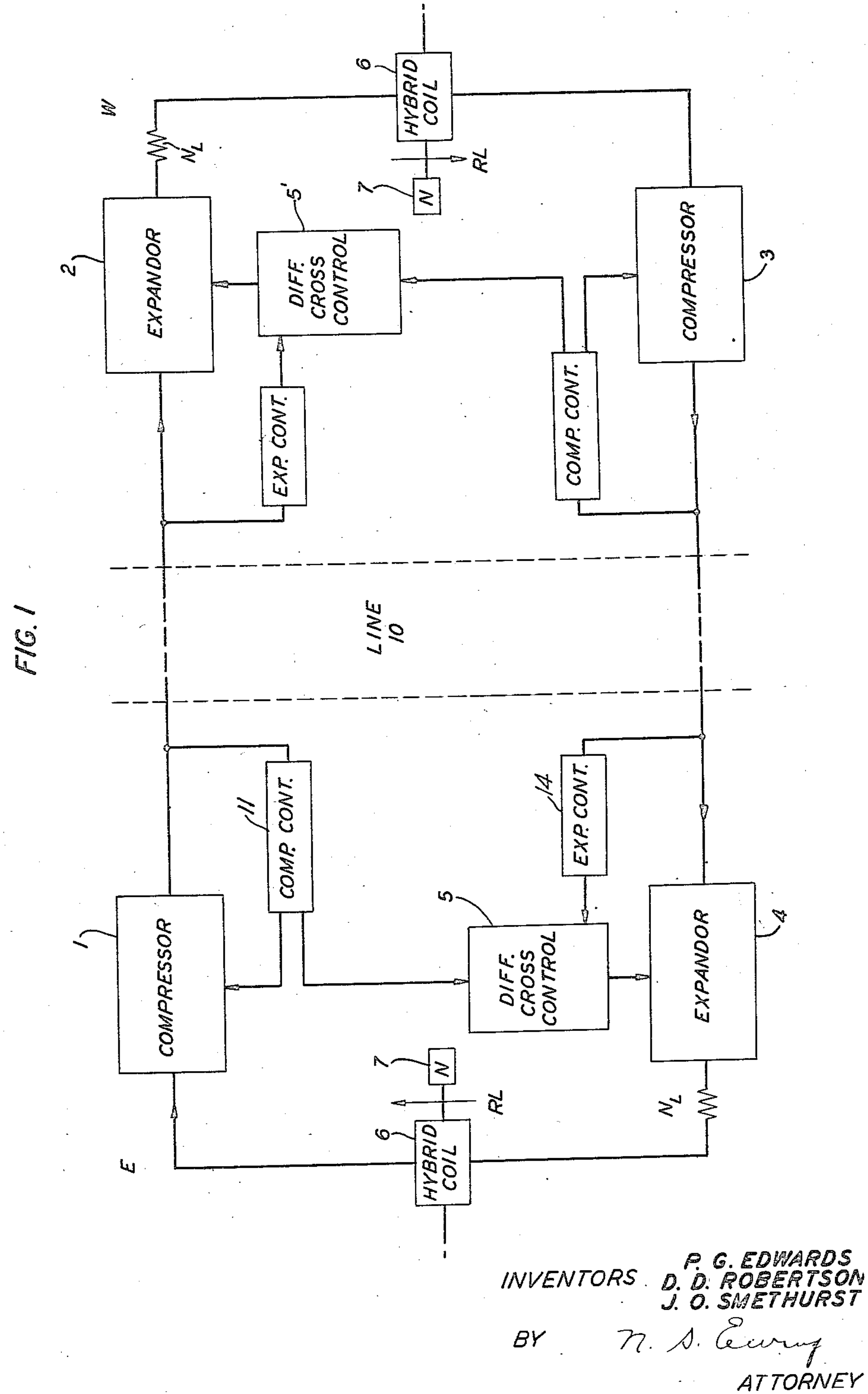

This invention relates to two-way signal transmission systems, and, more particularly, to compandor circuits for reducing signal distortion and noise in such systems.

A compandor consists of a signal-controlled device called a compressor at the transmitting end of a four-wire system or the like and a similar signal-controlled device called an expandor at the receiving end of the system.

The compressor operates to raise the level of signals of lower amplitude above the noise level of the communications medium before the transmission to the medium, while concomitantly reducing the higher amplitude signals to a level which will not overload the amplifiers or the like. The expandor at the receiving terminal operates in a reverse manner to restore the received signals to their original relative amplitudes, which they had at the transmitting end.

To obtain proper operation of a two-way signal transmission system, for example, a four-wire telephone circuit, it has been found desirable in the past to employ at the terminals or intermediate points in the system, signal-controlled switching apparatus, known as echo suppressors, to disable the transmission path for one direction while signal transmission is taking place over the path for the opposite direction, so as to prevent reflected signal energy or echoes from being returned to the transmitting end of the system and causing a disturbance or singing.

Cross-control circuits in compandors have been disclosed heretofore in United States Patent No. 2,164,344, issued to A. C. Norwine, and in United States Patent No. 2,328,951, issued September 7, 1943, to N. W. Bryant.

An object of the invention is to utilize such compandors to provide effective echo suppression.

Another object of the invention is to provide improved and more economical operation of four-wire telephone system by dispensing with special echo suppressor circuits through the use of compandors with cross-control from the compressor to the expandor.

Another object of the invention is to utilize compandors as echo suppressors and facilitate break-ins by the talkers from either terminal of the system.

Another object of the invention is to make low net loss circuits more stable with respect to singing tendencies through the use of cross-controlled compandors.

The above objects are accomplished in accordance with this invention by proper modification of the cross-control circuits between the compressor and expandor disclosed in the aforementioned Norwine and Bryant patents, such as to effectively combine the functions of a compandor and echo suppressor in one device.

A feature of the invention is a compandor with a unilateral cross-control circuit extending from the compressor to the expandor section of the compandor to maintain the maximum expandor loss or even to increase the expandor loss for the purpose of suppressing echoes.

Another feature of the invention is a unilateral cross-control circuit for compandors, whereby a distant subscriber may by raising his speech volume, cause the expandor control to momentarily exceed the compressor control, and thereby permit a talk spurt to pass through the expandor and effect a break.

In the aforementioned Norwine patent, the original purpose of the bilateral cross-control circuits was to reduce the effects of circuit net loss variations on the singing and echo characteristics of the system. This was accomplished by causing each compressor or expandor to control not only its own characteristic but the characteristic of its associated expandor or compressor in such a way that the round trip net loss of the echo was substantially unaffected.

In the United States patent to Bryant No. 2,328,951, issued September 7, 1943, there is disclosed a unilateral cross-control circuit from expandor to compressor. This arrangement has the advantage of improving the echo over that attainable with the bilateral cross-control of the aforementioned Norwine patent. With the unilateral type of cross control, the increase in echo loss cannot exceed net loss plus return loss. Such a method is obviously not well suited to low net loss circuits where a large improvement is desirable, and the arrangement of the Bryant patent involves the use of an auxiliary echo suppressor in which a relay, operating from the expandor, controls a separate suppressor loss in the associated compressor circuit input to provide a maximum added loss of 6 decibels as fixed by breaking characteristics.

In accordance with a preferred embodiment of the invention, cross-control is obtained by having a compressor control its associated expandor, in the opposite sense to the normal expandor self-control, so that the full expandor loss is held in the receiving branch of a four-wire circuit. When the compressor control due to speech exceeds the expandor control due to echo, the expandor loss will be held at its maximum value to suppress any echoes. Breaking is accomplished in the same manner as used in a differential echo suppressor. When the local subscriber is talking the distant subscriber may, by raising his speech volume, cause the expandor control to momentarily exceed the compressor control and permit a talk spurt or part of a talk spurt to pass through the expandor and effect a partial or complete break.

Figure 2:
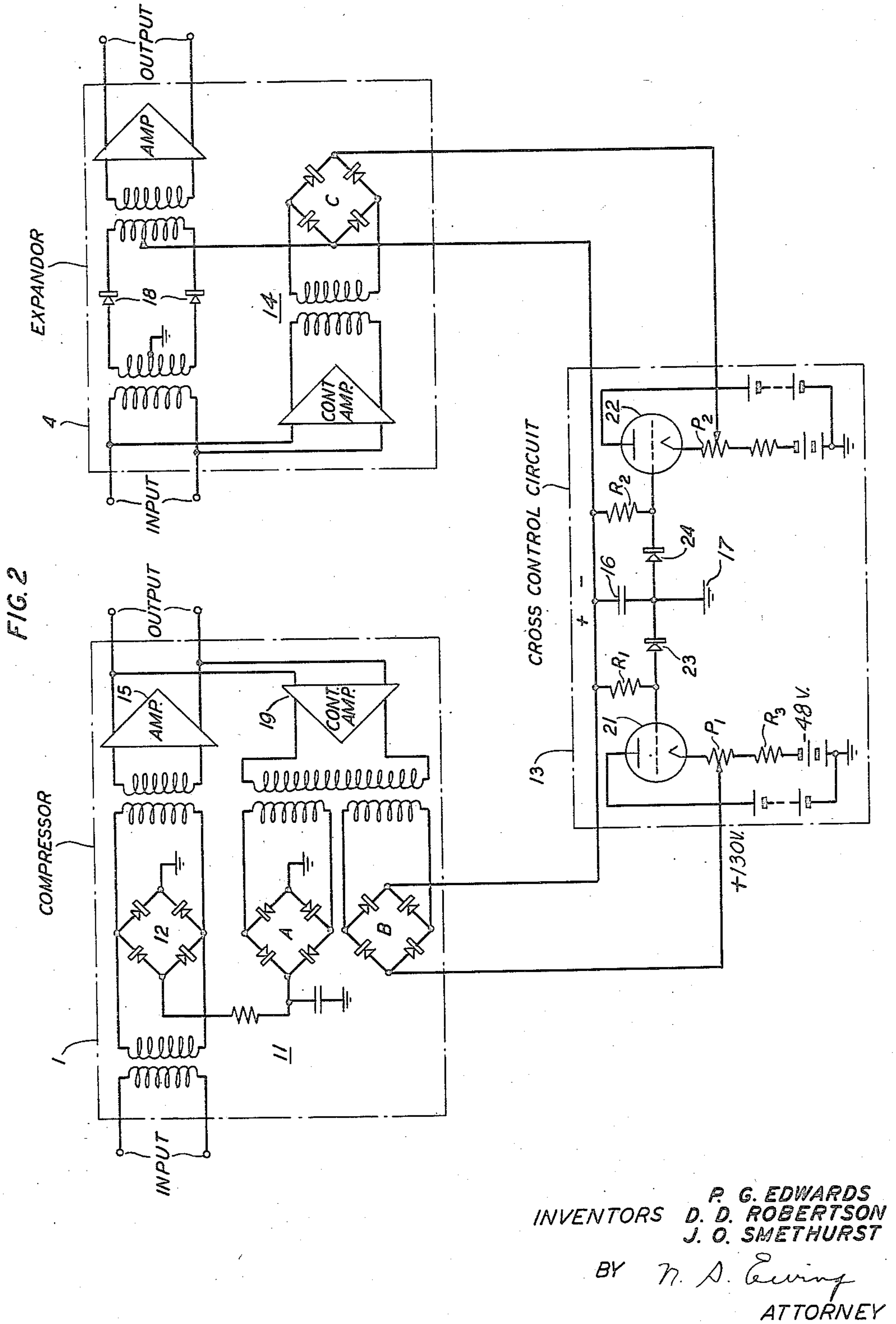
Figure 3:
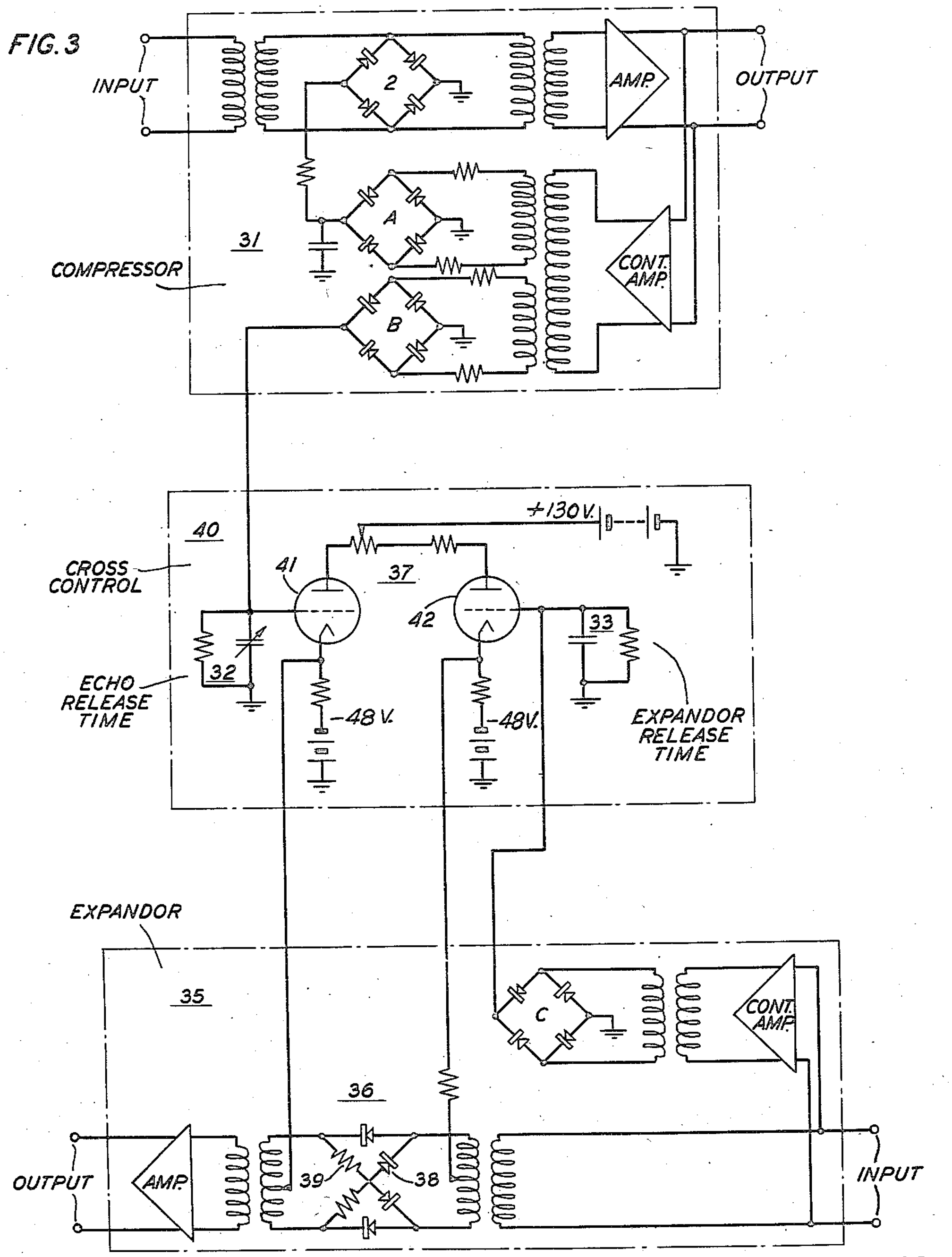

Referring to the figures of the drawing:

Fig. 1 shows a schematic of a four-wire circuit with cross-controlled compandors at terminals thereof; and Figs. 2 and 3 show specific forms of cross-controlled compandors in accordance with the invention.

Referring to Fig. 1, the compressor 1 in the east terminal compresses the input range of speech volumes for passage over a communications medium such as line 10, where a variety of noise and cross-talk interferences are present. The expandor 2 in the receiving terminal expands the received range of compressed speech volumes to the original range.

When the circuit is idle, 28 db of gain is introduced by the compressor 1 or 3 and 28 db loss by the expandor 2 or 4. Any disturbance in the transmission medium in the absence of speech receives 28 db attenuation in the expandor 2 or 4.

Loss is removed from an expandor as the speech volume increases. In a well-designed compandor with proper time constants, the increased speech volume will tend to mask the increased noise. Interferences to the listener during silent speech periods, such as intelligible cross-talk or audible tones, receive the full 28 db of noise suppression in the expandor.

A standard hybrid coil 6 and balancing network 7 indicated in Fig. 1 serve to segregate the two directions of transmission at the E, W terminals.

The line 10 between the two-terminals EW, may carry voice frequency or carrier and it may include a radio link.

Net loss variations in a communications channel are deviations from the nominal or assigned value of overall net loss. These may occur from a variety of causes, but on wire lines primarily from variation in temperature and aging of line repeaters and associated equipment. A positive variation which increases the net loss, is undesirable because the loudness of the speed heard by the subscribers is reduced. Negative variations, though improving the loudness of the speech, also may be undesirable if too great because speech currents reflected from the far end of a circuit then may be audible as an annoying echo. If the negative variation is extreme, the circuit finally may become unstable and sing.

A unilateral cross-control circuit 5, extends from a compressor 1 to its associated expandor 4 in the same terminal, and serves to suppress echoes effectively enough to eliminate the need of special echo suppression circuit.

When the compressor cross-control due to speech exceeds the expandor control due to echo, the expandor's vario-losser will be held at its maximum value to suppress any echoes. When the local subscriber is talking, the distant subscriber may, by raising his speech volume cause the expandor control to momentarily exceed the compressor control to remove the expandor loss and permit a talk spurt or a part thereof to pass through the expandor and effect a partial or complete break.

This type of cross-control will produce a different effect on the operation of a four-wire toll circuit than has previously been encountered with echo suppressors or compandors. Suppose, for instance, that speech is applied to the A end of the four-wire circuit and that the net loss plus return loss at the far end of the circuit, B is low. In this case, a strong echo signal will be applied to the B end compressor 3 whose cross-control will insert additional loss into its associated expandor 2 to increase the effective net loss and reduce the received volume to the B subscriber. For low input levels, the added net loss is zero and it approaches a maximum of 11 db at the high talker levels when the net loss plus return loss is zero. As a result of this, the far end cross-control will produce a circuit whose net loss is variable and a function of the talker volume. Limiting the high volume talkers also proves to be beneficial because of the added improvement in echo loss.

*Description of cross-control circuits*

Fig. 2 shows a specific form of cross-controlled compandor circuit wherein the control is achieved by a charged condenser, subjected to charging by the compressor and expandor, respectively.

Input voice signals to the compressor 1 pass through the germanium vario-losser 12 thereof, and are compressed to half the input volume range, thence they are amplified in amplifier 15, which may be a two-stage feedback amplifier or the like. Most of the amplifier output is fed through a compressor control amplifier 19, whence it is rectified in a bridge rectifier A, having germanium rectifier elements. A condenser-resistance filter passes only the rectified syllabic envelope of the speech frequencies.

The positive output of rectifier A is used to control the vario-losser 12 while a second rectifier B connected to the amplifier 19 serves to provide the voltage for the cross-control circuit 13.

The rectified current from rectifier B is poled to charge capacitor 16 in a positive direction with respect to ground 17.

The expandor 4 shown in the upper right hand section has a rectifier C connected to furnish a negative rectified current, which will charge capacitor 16 minus with respect to ground 17. When capacitor 16 is charged negatively, with respect to ground, the rectified current supplied by rectifier C will operate the expandor vario-losser 18 in the normal way, removing loss for increasing inputs. However, when capacitor 16 is charged positively, with respect to ground by the compressor rectifier B, the positive voltage developed across capacitor 16 will bias the expandor losser, in the nonconducting direction, and maintain a high loss.

It should be noted that when capacitor 16 is charged with a positive potential as above that any input to the expandor produces a tendency for expandor rectifier C to discharge this voltage. Conversely, when capacitor 16 is charged with a negative potential, the compressor rectifier B tends to discharge the voltage and to make the desired action inoperative. To prevent these discharges from occurring, guard circuits are incoporated into the control circuit to isolate the rectifiers B and C from capacitor 16. Triode vacuum tubes 21 and 22, connected as cathode followers, and varistors 23 and 24 are used for this purpose.

In the idle condition, with no input to either compressor 1 or expandor 4, the potentiometers P1 and P2 are adjusted so that a condition of zero D. C. potential exists between the slider arms of the potentiometers and ground. For example, as shown the plate battery may provide +130 volts and the cathode battery −48 volts, both with respect to ground. Accordingly the voltage divider comprising the space path of tube 21, potentiometer $P_1$, and resistor $R_3$ permit that there may be taken off at the potentiometer slider any voltage with respect to ground within a wide range including zero. From this it follows that the D. C. potential across capacitor 16 is zero and no voltage is inserted in series with rectifiers B and C.

When input is applied to the compressor 1, rectifier B will charge capacitor 16 to a positive potential. Varistor 23 is poled so that a positive voltage across capacitor 16 will cause current to flow through it, reducing its resistance to a very low value, and the voltage drop between the grid of tube 11 and ground is made practically zero volts. The voltage drop across P1 and R3 will remain unchanged and no potential drop is inserted in series with rectifier B to decrease the charge on capacitor 16. At the same time, a positive potential on capacitor 16 will cause varistor 24 to remain at its highest resistance level and the full voltage across the capacitor will be applied through resistor R2 between grid and ground of tube 22. The cathode follower action of tube 22 will then cause its cathode to become positive, by an amount nearly equal to the potential across capacitor 16 and will be applied in series with rectifier C to oppose the voltage across capacitor 16. The effect of this action is to hold the resistance of rectifier C at a fairly high value and prevent it from discharging the control potential across capacitor 16.

When capacitor 16 is charged to a negative voltage by the expandor control circuit, tube 21 and rectifier B will act in the same manner as described above to prevent the discharge of capacitor 16. Resistor R1 controls the hangover time to hold the expandor loss high for echoes and resistor R2 is used to provide the normal recovery time of the expandor.

The cross-control circuit shown on Fig. 3 provides separate and independent controls for the echo and expandor hangover times. The compressor circuit 31 has a separate rectified output B brought out to operate the cross-control circuit as in Fig. 2. The output of this rectifier is connected to the grid of tube 41 located in the cross-control circuit 40 through a variable resistance-capacitance network 32 to provide the echo hangover times required for various lengths of toll circuits. The expandor control rectifier C has its output applied to the grid circuit of tube 42. Here again, a separate resistance-capacitance network 33 is used to provide the hangover time for a normal expandor.

The cross-control circuit 40 is made up of triode vacuum tubes 41 and 42 arranged as cathode followers and connected to form a balanced bridge. The expandor vario-losser 36 is connected across the balance points, which in this case are the cathode terminals of tubes 41 and 42. A potentiometer 37 is used in the common plate connection between the two tubes for adjusting the losser current to meet the input-output characteristic of the expandor at its minimum input level.

When an input signal is applied to the compressor 31 the cross-control current from rectifier B will flow through the grid resistor to ground making the grid of tube 41 more positive with respect to its cathode. The cathode of tube 41 becomes more positive than the cathode of tube 42 and a voltage is impressed across the expandor losser 35 to hold it in the high loss condition. An additional loss of about 20 db is obtained to improve the echo suppression by utilizing additional balancing impedance elements 38, 39 shunted across the expandor losser 36. As shown in Fig. 3, two germanium varistors 38 and two resistors 39 are used as the balancing elements to make a lattice network which is effective only when the compressor is operated.

When input signals are applied to the expandor 35, the rectified current from its control rectifier C will flow through the grid resistor of tube 42, to ground and make the grid more positive with respect to its cathode. The cathode of tube 42 then becomes more positive than the cathode of tube 41 and current will flow through the expandor losser, in the forward direction, to remove loss in the normal way. At the same time, this voltage is impressed across the balancing varistors in the reverse direction, to make their resistance very high so that the balancing network will be effectively removed from the losser circuit. This type of cross-control circuit will add echo loss in three different ways: (1) the normal loss inserted into the receiving side by the voltage impressed across the expandor losser by the compressor control circuit, (2) the additional loss obtained by the balancing network in the expandor losser, and (3) the normal expandor loss which will be proportional to the differential voltage existing between the cathode of tube 41, due to speech operation of the compressor, and the cathode of tube 42 by the operation of the expandor on echoes.

The net result of the cross-control was found thus to insure that as the circuit input and the corresponding echoes increase, the echo loss also increases so that for the highest level talkers there is an echo loss of about 60 db depending upon the return loss.

Part of this high echo loss is obtained by the impedance elements 38, 39 inserted into the expandor losser circuit 35. Since higher losses would add further echo improvement, a study was made to determine the optimum input, to the compressor 31 at which the expandor 35 should be balanced to secure the greatest echo losses over the widest range of inputs. There appears to be an optimum input to the compressor at which the expandor can be balanced to increase the echo loss over a wide range of useful inputs. Rebalancing the losser for inputs above or below this optimum value will degrade the performance at the higher input levels where the greater losses will add the most echo improvement. At high input levels the added echo loss is about 20 db and tapers off to show no improvement at the very low input levels where echoes are less bothersome.

What is claimed is:

1. In a telephone station for two oppositely directed one-way transmission paths, a volume compressor in the transmission path, a volume expandor in the receiving path and a unilateral cross-control circuit for controlling the action of the expandor in response to the regulation exercised on said compressor, said cross-control circuit comprising a bridge having a cathode follower amplifier in each of two arms thereof, one of said amplifiers being controlled by a voltage proportional to the output of the compressor and the other of said amplifiers being controlled by voltage proportional to the input of said expandor, said bridge being balanced in the absence of an output from said compressor and a signal input to said expandor, and connections from balanced points on said bridge to said expandor to control its action in an opposite sense to which it is controlled by input signals thereto in response to voltages proportional to the output of the compandor and to override said controlling action in response to voltages proportional to inputs to said expandor above a predetermined level and relative to the level of the voltage proportional to the output of said compressor.

2. In a telephone station according to claim 1, a time constant circuit in the connections for supplying the voltage proportional to the output of said compressor to said control circuit for determining a predetermined hangover time for echo loss and an independent time constant circuit in the connections for supplying the voltage proportional to the input to said expandor to said cross-controlled circuit for providing a predetermined recovery time for said expandor.

References Cited in the file of this patent

UNITED STATES PATENTS 2,164,344 Norwine ---------------- July 4, 1939